Patented Sept. 1, 1953

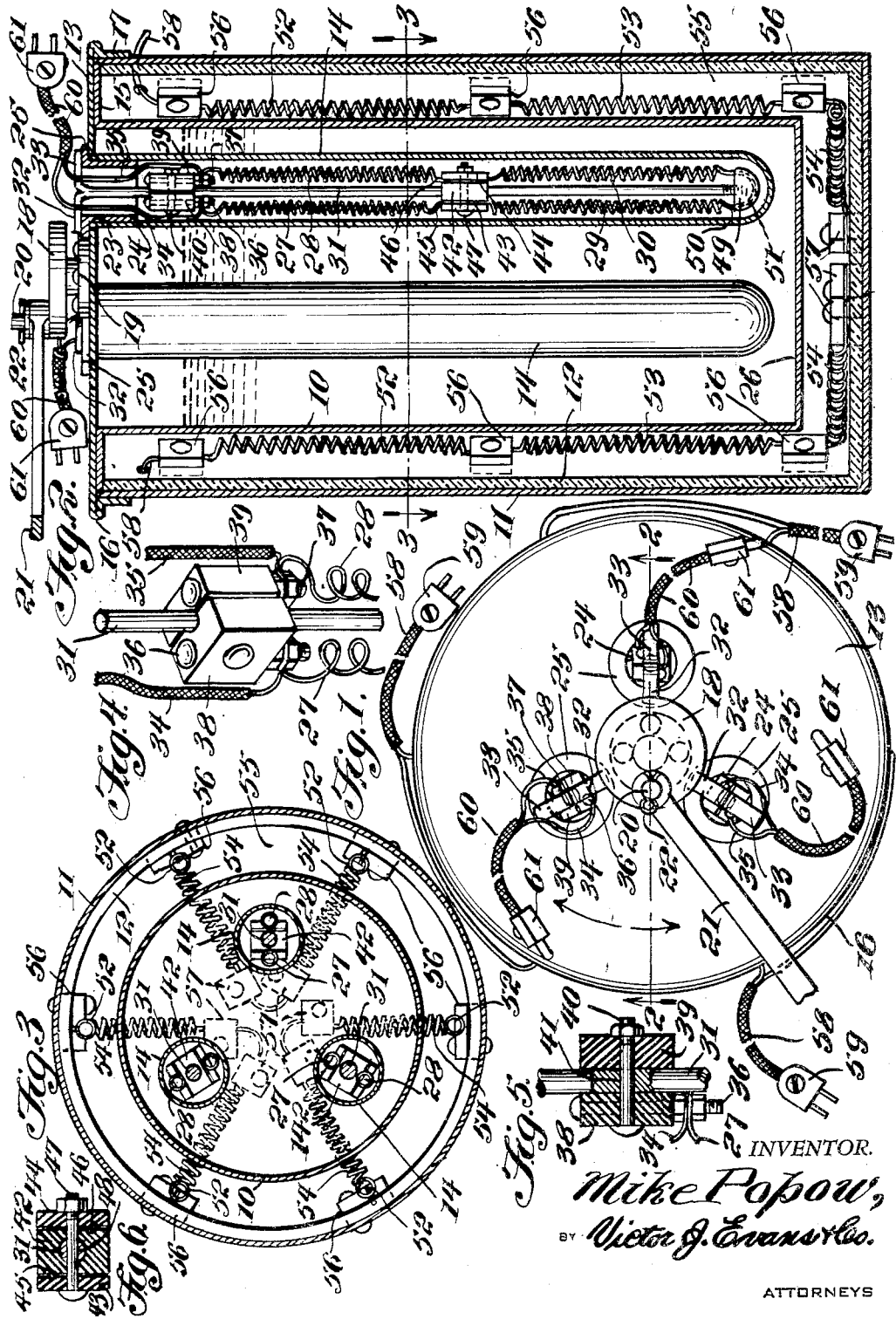

2,650,980

UNITED STATES PATENT OFFICE 2,650,980

AGITATED MILK PASTEURIZER

Mike Popow, Philmont, N. Y.

Application November 25, 1949, Serial No. 129,214

3 Claims. (Cl. 219—44)

This invention relates to milk pasteurizing devices where milk is treated by heat, and in particular a container suspended in a casing with electric heating elements in an area between the container and casing, and also a plurality of spaced tubes with heating elements therein extended downwardly into the milk container and carried by a cover plate journaled on the upper end of the casing whereby the tubes are reciprocated to continuously agitate milk in the container during pasteurization.

The purpose of this invention is to provide an improved milk pasteurizer wherein heat in sealed elements is distributed throughout the body of milk whereby all of the milk is subjected to heat.

Various devices have been provided for treating milk with heat for pasteurization but where the milk is treated in containers the milk adjacent the walls of the container is thoroughly pasteurized whereas milk in the intermediate parts thereof, which is not subject to the extreme heat, is not affected by the pasteurizing process. With this thought in mind this invention contemplates a milk pasteurizing container wherein heat is not only applied to the wall of the container but is also provided in spaced depending tubes distributed through the bulk of the milk and the tubes are reciprocated to continuously agitate the milk during pasteurization.

The object of this invention, therefore, is to provide an improved pasteurizer for milk and the like in which the pasteurizing elements are distributed throughout the body of the milk and the milk is agitated continuously to insure contact thereof with the pasteurizing elements.

Another object of the invention is to provide an improved milk pasteurizer that is not only adapted for use by the average dairy but that may also be used by the farmer.

A further object of the invention is to provide an improved milk pasteurizer wherein the heating elements are distributed throughout the body of the milk and in which the milk is agitated, which is of a comparatively simple and economical construction.

With these and other objects and advantages in view the invention embodies a double wall container with a rotatable cover positioned on the upper end with electric heating elements in sealed tubes carried by the cover and also with electric heating elements positioned between the walls of the container.

Other features and advantages of the invention will appear from the following description taken in connection with the drawings wherein:

Figure 1 is a plan view of the pasteurizer showing the electrical connections to the heating elements.

Figure 2 is a vertical cross section through the pasteurizer with a crank extended from the upper end for reciprocating the cover.

Figure 3 is a sectional plan through the pasteurizer taken on line 3—3 of Figure 2.

Figure 4 is a detail illustrating the electrical connections in the depending tubes between the heating elements and current supply wires.

Figure 5 is a vertical section through one of the connections as illustrated in Figure 4.

Figure 6 is a sectional plan through the connection shown in Figure 4.

Referring now to the drawings wherein like reference characters denote corresponding parts the milk pasteurizer of this invention includes an inner milk container 10 an outer casing 11 with a lining 12 of glass or other suitable material, a cover 13 and a plurality of depending tubes 14.

The inner container 10, which may be made of stainless steel, plastic, glass, or the like is provided with a flange 15 at the upper end, which extends outwardly to the upper edge of the outer casing 11, as shown in Figure 2. The cover 13 which is freely positioned on the casing 11 is provided with a peripheral bead 16 and a depending flange 17 which provides a bearing journaling the cover on the casing whereby the cover may be rotated or reciprocated. A disc 18 is mounted on the cover through a base 19 and the disc is provided with an eccentrically positioned pin 20 on which a crank 21 is pivotally mounted, as illustrated in Figure 1. The crank is held in position by a cotter pin 22.

The cover 13 is provided with spaced openings 23 in which sleeves 24 with flanges 25 on the upper end are positioned as shown in Figure 2 and the tubes 14 are supported by these sleeves. The tubes 14 extend downwardly in spaced relation through the body of milk in the inner container 10 with the lower ends of the tubes spaced from the lower end or bottom 26 of the container, and with these tubes positioned in this manner the heating elements may be distributed throughout the body of the milk or other fluid.

The heating elements 27 and 28, and 29 and 30 are suspended in the tube 14 by rods 31 which are formed with split upper ends 32 and 33 and, as illustrated in Figure 4, the upper ends of the elements 27 and 28 are connected to supply wires 34 and 35 by bolts 36 and 37, respectively, which are mounted in blocks 38 and 39, and the blocks are mounted on the rod 31 by screws 40 which extend through openings 41 in the rod, as shown in Figure 5. With the blocks 38 and 39 formed of insulating material, the elements are insulated from the supporting rods 51.

The lower heating elements 29 and 30 are connected to the upper heating elements 27 and 28, respectively through an insulating support formed by an intermediate block 42 with blocks 43 and 44 at the sides. The elements are connected by wires 45 and 46 which are clamped between the blocks by a bolt 47 that extends through an opening 48 in the rods 31. Shoes 49 are provided on the lower ends of the rods 31 around which wires 50 connecting the lower ends of the elements 29 and 30 extend. The shoes are provided with grooves 51 in which the wires 50 are positioned.

The tubes 14, which are suspended from the cover are parallel and these tubes are radially disposed and spaced throughout the interior of the inner container whereby heat is carried throughout a body of milk in the container. The tubes are carried substantially to the lower end of the container and as the cover is reciprocated the tubes agitate the milk and cause substantially all of the milk to come into contact with the tubes.

Sets of heating elements 52, 53, and 54 are positioned in the area 55 between the inner container 10 and the lining 12 of the casing 11 and these elements are mounted on the side walls by insulating blocks 56 and on the base by insulating blocks 57. Each of these sets of elements is connected to a separate cable, as indicated by the numeral 58 and each cable is provided with a plug 59. The elements of the tubes 14 are also connected to individual cables 60 and these cables are provided with plugs 61. By this means each individual set of heating elements is individually connected to a source of current supply whereby the connecting wires are not overloaded.

With the parts arranged in this manner milk placed in the inner container 10 is subjected to heat from the surrounding wall of the container and also from the individual tubes extended downwardly from the cover of the container, and with the tubes reciprocated through the cover the milk is continuously agitated by the heating elements during pasteurization. The entire body of milk is, therefore, subjected to the heat and thorough pasteurization thereof is obtained.

It will be understood that these units may be formed of any suitable material and of any suitable size and it will also be understood that a battery of units may be used in combination.

It will be understood that modifications may be made in the design and arrangement of the parts without departing from the spirit of the invention.

What is claimed is:

1. In a pasteurizer, the combination which comprises an outer casing having a cylindrical wall with a bottom in the lower end and in which the upper end is open, an inner container also having a cylindrical wall with a bottom in the lower end and in which the upper end is open, the wall and bottom of the inner container being spaced from the wall and bottom of the outer casing, spaced heating elements positioned between the walls and bottoms of the outer casing and inner container, the upper end of said inner container being connected to the upper end of said outer casing providing a closure for the area between the walls of the container and outer casing, a cover positioned on the upper end of the outer casing, said cover having an annular depending flange journaling the cover on the upper end of the outer casing, spaced parallel tubes carried by the cover and extended downwardly into said inner container to a plane spaced a short distance from the bottom of said inner container, heating elements positioned in said parallel tubes, and means for reciprocating the cover whereby a product positioned in the inner casing is agitated by the spaced parallel heating tubes.

2. In a pasteurizer, the combination which comprises an outer casing having a cylindrical wall with a bottom in the lower end and in which the upper end is open, an inner container also having a cylindrical wall with a bottom in the lower end and in which the upper end is open, the wall and bottom of the inner container being spaced from the wall and bottom of the outer casing, spaced heating elements positioned between the walls and bottoms of the outer casing and inner container, the upper end of said inner container being connected to the upper end of said outer casing providing a closure for the area between the walls of the container and outer casing, a cover positioned on the upper end of the outer casing, said cover having an annular depending flange journaling the cover on the upper end of the outer casing, spaced parallel tubes carried by the cover and extended downwardly into said inner container to a plane spaced a short distance from the bottom of said inner container, heating elements positioned in said parallel tubes, independent electrical supply connections extended from heating elements in the tubes and also extended from heating elements in the area between the walls of the inner container and outer casing, and means for reciprocating the cover whereby a product positioned in the inner casing is agitated by the spaced parallel heating tubes.

3. In a pasteurizer, the combination which comprises an outer casing having a cylindrical wall with a bottom in the lower end and in which the upper end is open, an inner container also having a cylindrical wall with a bottom in the lower end and in which the upper end is open, the wall and bottom of the inner container being spaced from the wall and bottom of the outer casing, spaced heating elements positioned between the walls and bottoms of the outer casing and inner container, the upper end of said inner container being connected to the upper end of said outer casing providing a closure for the area between the walls of the container and outer casing, a cover positioned on the upper end of the outer casing, said cover having an annular depending flange journaling the cover on the upper end of the outer casing, spaced parallel tubes carried by the cover and extended downwardly into said inner container to a plane spaced a short distance from the bottom of said inner container, heating elements positioned in said parallel tubes, said heating elements being divided into upper and lower sections, insulating blocks positioned in the tubes providing separating means between sections of the heating elements, and vertically disposed support rods, rods extended through the tubes for supporting the heating element and insulating blocks from the upper ends of the tubes.

MIKE POPOW.

References Cited in the file of this patent

UNITED STATES PATENTS

| Number | Name | Date |
| --- | --- | --- |
| 972,248 | Richmond | Oct. 11, 1910 |
| 1,464,782 | Stubbs | Aug. 14, 1923 |
| 1,692,270 | Jensen | Nov. 20, 1928 |
| 1,984,956 | Anglim | Dec. 18, 1934 |
| 2,227,536 | D'Agostino | Jan. 7, 1941 |
| 2,258,210 | Maxwell | Oct. 7, 1941 |
| 2,467,492 | Olson | Apr. 19, 1949 |
| 2,569,958 | Struve et al. | Oct. 2, 1951 |

FOREIGN PATENTS

| Number | Country | Date |
| --- | --- | --- |
| 794,491 | France | Feb. 18, 1936 |